United States Patent
Allen et al.

(10) Patent No.: US 8,171,145 B2
(45) Date of Patent: *May 1, 2012

(54) SYSTEM AND METHOD FOR TWO WAY COMMUNICATION AND CONTROLLING CONTENT IN A GAME

(75) Inventors: Christopher Allen, Jamaica Plain, MA (US); Trevor Burton, Barrow-on-Humber (GB); Andrew Zupko, Huntsville, AL (US); Dominik Accattato, Brookline, MA (US)

(73) Assignee: Brass Monkey, Inc., Jamaica Plain, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,951

(22) Filed: Mar. 7, 2011

(65) Prior Publication Data

US 2011/0219130 A1 Sep. 8, 2011

Related U.S. Application Data

(60) Provisional application No. 61/311,102, filed on Mar. 5, 2010, provisional application No. 61/421,977, filed on Dec. 10, 2010.

(51) Int. Cl.
*G06F 15/16* (2006.01)
*G06F 15/173* (2006.01)

(52) U.S. Cl. .................. 709/227; 709/224; 709/226

(58) Field of Classification Search .................. 709/224, 709/204, 205, 206
See application file for complete search history.

(56) References Cited

U.S. PATENT DOCUMENTS

| | | | |
|---|---|---|---|
| 6,468,160 | B2 | 10/2002 | Eliott |
| 6,678,246 | B1 | 1/2004 | Smyth |
| 6,684,062 | B1 * | 1/2004 | Gosior et al. .................. 455/73 |
| 7,143,137 | B2 | 11/2006 | Maufer et al. |
| 7,292,588 | B2 | 11/2007 | Milley et al. |
| 7,493,383 | B1 | 2/2009 | Mukerji |
| 7,664,096 | B2 | 2/2010 | Doherty et al. |
| 7,730,401 | B2 | 6/2010 | Gillespie et al. |
| 7,797,417 | B2 | 9/2010 | Choi |
| 7,818,788 | B2 | 10/2010 | Meier |
| 7,828,654 | B2 | 11/2010 | Carter |

(Continued)

FOREIGN PATENT DOCUMENTS

EP 1335535 8/2003

(Continued)

OTHER PUBLICATIONS

Schulzrinne, H., et al., "Real Time Streaming Protocol (RTSP)", Network Working Group, pp. 1-92, (Apr. 1998).

(Continued)

*Primary Examiner* — Karen Tang
(74) *Attorney, Agent, or Firm* — Greenberg Traurig, LLP; Chinh H. Pham; Seth A. Milman

(57) ABSTRACT

A method for two way communication and control of a game may include executing, by a host device in communication with a computer network, a game application within a web browser. A communication channel is established over the computer network and between the game application and a controller application running on an endpoint device. Data is sent over the communication channel for controlling and playing the game application within the game application. A system for two way communication and control of a game is also provided.

20 Claims, 6 Drawing Sheets

U.S. PATENT DOCUMENTS

| | | | |
|---|---|---|---|
| 7,865,573 | B2 | 1/2011 | Tyhurst et al. |
| 7,890,957 | B2 | 2/2011 | Campbell |
| 2001/0032265 | A1 | 10/2001 | Tanaka |
| 2002/0091831 | A1 | 7/2002 | Johnson |
| 2002/0151327 | A1 | 10/2002 | Levitt |
| 2003/0001883 | A1 | 1/2003 | Wang |
| 2003/0046374 | A1 | 3/2003 | Hilt et al. |
| 2005/0003824 | A1 | 1/2005 | Siris |
| 2005/0015584 | A1 | 1/2005 | Takechi et al. |
| 2005/0071481 | A1* | 3/2005 | Danieli ............... 709/229 |
| 2005/0138460 | A1 | 6/2005 | McCain |
| 2005/0192099 | A1* | 9/2005 | Nguyen et al. ........ 463/42 |
| 2005/0261815 | A1 | 11/2005 | Cowelchuk et al. |
| 2005/0267935 | A1* | 12/2005 | Gandhi et al. ........ 709/203 |
| 2006/0039356 | A1 | 2/2006 | Rao et al. |
| 2006/0046819 | A1* | 3/2006 | Nguyen et al. ........ 463/16 |
| 2006/0063590 | A1* | 3/2006 | Abassi et al. ........ 463/29 |
| 2006/0117107 | A1 | 6/2006 | Shafron et al. |
| 2006/0152752 | A1 | 7/2006 | Yamaguchi et al. |
| 2006/0267936 | A1 | 11/2006 | Hoerl et al. |
| 2006/0288343 | A1* | 12/2006 | Pallister ............... 717/168 |
| 2006/0291434 | A1* | 12/2006 | Gu et al. ............... 370/338 |
| 2007/0088851 | A1* | 4/2007 | Levkovitz et al. ..... 709/246 |
| 2007/0088852 | A1* | 4/2007 | Levkovitz ............ 709/246 |
| 2007/0100514 | A1 | 5/2007 | Park |
| 2007/0198144 | A1 | 8/2007 | Norris et al. |
| 2007/0293319 | A1* | 12/2007 | Stamper et al. ........ 463/42 |
| 2008/0076495 | A1* | 3/2008 | Ng et al. ............... 463/1 |
| 2008/0102919 | A1* | 5/2008 | Rowe et al. ............ 463/18 |
| 2008/0167732 | A1 | 7/2008 | Slavin et al. |
| 2008/0183307 | A1 | 7/2008 | Clayton et al. |
| 2008/0229095 | A1 | 9/2008 | Kalimuthu |
| 2008/0235106 | A1* | 9/2008 | Reisman ............... 705/26 |
| 2008/0243694 | A1* | 10/2008 | Johnson et al. ........ 705/52 |
| 2008/0261686 | A1 | 10/2008 | Bedingfield |
| 2008/0268959 | A1* | 10/2008 | Bryson et al. ........ 463/42 |
| 2008/0287182 | A1* | 11/2008 | Aida ..................... 463/25 |
| 2008/0291916 | A1 | 11/2008 | Xiong et al. |
| 2008/0305854 | A1* | 12/2008 | Graham et al. ........ 463/25 |
| 2008/0312782 | A1 | 12/2008 | Berdichevsky et al. |
| 2009/0005138 | A1* | 1/2009 | Stamper et al. ........ 463/1 |
| 2009/0036216 | A1* | 2/2009 | Ratcliff ............... 463/42 |
| 2009/0055749 | A1 | 2/2009 | Chatterjee et al. |
| 2009/0060452 | A1 | 3/2009 | Chaudhri |
| 2009/0062014 | A1* | 3/2009 | Gift et al. ............ 463/42 |
| 2009/0128504 | A1 | 5/2009 | Smith |
| 2009/0135765 | A1 | 5/2009 | Lewis et al. |
| 2009/0153289 | A1 | 6/2009 | Hope et al. |
| 2009/0156303 | A1* | 6/2009 | Kiely et al. ........... 463/29 |
| 2009/0199259 | A1* | 8/2009 | Alao et al. ............ 725/147 |
| 2009/0199275 | A1* | 8/2009 | Brock et al. .......... 726/4 |
| 2009/0209350 | A1* | 8/2009 | Kelly et al. ........... 463/42 |
| 2009/0215541 | A1* | 8/2009 | Liu et al. ............. 463/42 |
| 2009/0248542 | A1* | 10/2009 | Houvener et al. ...... 705/27 |
| 2009/0264202 | A1* | 10/2009 | Chen et al. ........... 463/42 |
| 2009/0291760 | A1* | 11/2009 | Hepburn et al. ....... 463/37 |
| 2009/0300137 | A1 | 12/2009 | Tyhurst et al. |
| 2009/0305789 | A1* | 12/2009 | Patil ................... 463/42 |
| 2009/0319644 | A1 | 12/2009 | Fagioli et al. |
| 2010/0016077 | A1* | 1/2010 | Longdale ............. 463/37 |
| 2010/0023338 | A1* | 1/2010 | Petronelli et al. ..... 705/1 |
| 2010/0029376 | A1* | 2/2010 | Hardy et al. .......... 463/25 |
| 2010/0062857 | A1* | 3/2010 | Kert et al. ............ 463/42 |
| 2010/0136568 | A1* | 6/2010 | Rigby ................. 435/6 |
| 2010/0172287 | A1* | 7/2010 | Krieter ................ 370/328 |
| 2010/0184422 | A1 | 7/2010 | Ahrens |
| 2010/0198698 | A1* | 8/2010 | Raleigh et al. ........ 705/26 |
| 2010/0240460 | A1* | 9/2010 | Miyanaga ............. 463/43 |
| 2010/0255903 | A1* | 10/2010 | Bala ................... 463/30 |
| 2010/0267448 | A1 | 10/2010 | Snoddy et al. |
| 2010/0287155 | A1* | 11/2010 | Reisman .............. 707/709 |
| 2010/0299436 | A1 | 11/2010 | Khalid et al. |
| 2010/0317437 | A1* | 12/2010 | Berry et al. .......... 463/35 |
| 2011/0009193 | A1 | 1/2011 | Bond et al. |
| 2011/0040826 | A1* | 2/2011 | Chadzelek et al. ..... 709/203 |
| 2011/0086706 | A1* | 4/2011 | Zalewski ............. 463/36 |
| 2011/0112895 | A1* | 5/2011 | Snyder ................ 705/14.12 |
| 2011/0157196 | A1* | 6/2011 | Nave et al. ........... 345/522 |
| 2011/0165937 | A1* | 7/2011 | Chen et al. ........... 463/25 |
| 2011/0230260 | A1* | 9/2011 | Morrow et al. ........ 463/30 |
| 2011/0258623 | A1* | 10/2011 | Wagner et al. ........ 718/1 |

FOREIGN PATENT DOCUMENTS

| | | |
|---|---|---|
| WO | WO 2009/055717 | 4/2009 |
| WO | WO 2010/062617 | 6/2010 |
| WO | WO 2010/088313 | 8/2010 |
| WO | WO 2010/093831 | 8/2010 |
| WO | WO 2010/112839 | 10/2010 |

OTHER PUBLICATIONS

PCT International Search Report based on International Application No. PCT/US2011/027431 dated Apr. 28, 2011.

PCT International Search Report based on International Application No. PCT/US2011/027429 dated Apr. 29, 2011.

PCT International Search Report based on International Application No. PCT/US2011/027294 dated May 6, 2011.

PCT International Search Report based on International Application No. PCT/US2011/027295 dated May 9, 2011.

Office Action in U.S. Appl. No. 13/042,286 mailed Sep. 15, 2011.

* cited by examiner

SYSTEM AND METHOD FOR TWO WAY COMMUNICATION AND CONTROLLING CONTENT IN A GAME

CROSS-REFERENCE TO RELATED APPLICATIONS

This application claims priority to and benefit of Provisional Patent Application Ser. No. 61/311,102, filed on Mar. 5, 2010, and to Provisional Patent Application Ser. No. 61/421,977, filed on Dec. 10, 2010. Both applications 61/311, 102 and 61/421,977 are incorporated herein by reference in their entirety.

TECHNICAL FIELD

This invention relates generally to the field of communication over a network, and more particularly, to communication between a game application executing within a browser and a remote application.

BACKGROUND

With the rise of mobile computing, more and more devices are able to connect to computer networks. Network communication is no longer limited to PCs and laptops. Mobile phones and smart phones can typically connect not only to mobile telephone networks, but also Wi-fi networks, Bluetooth® networks, USB networks, etc. Other devices, which historically were not able to connect to computer networks, are entering the market already configured to access the internet. Televisions, DVD players, and even home appliances have network and internet capability.

Mobile applications have also become increasingly popular. Smart phones, such as the iPhone® device, Android® phones, or Blackberry® phones can download and run a broad array of different applications, from games and movie players to productivity and work tools.

Browser applications are attractive to developers because they can be relatively easy to develop and deploy. Browser applications also provide dynamic and customizable content for display within a web browser. A browser application developer could create, for example, a video game or media presentation application that can run within a web browser.

Browser applications, such as FLASH® applications, Unity™ applications, JavaScript® applications, and the like, can be downloaded and run by a web browser without the need to install the application directly onto a local computer. Rather, a user can run a browser application simply by directing his or her browser to a URL that provides a browser application. The web browser will then load and execute the browser application directly, downloading it just as if the user were viewing a static web page. Many browser applications are game applications that users can connect to, control, and play for entertainment.

However, browser applications are typically subject to security restrictions. Web browsers often employ a security scheme, sometimes called sandbox security, that restricts browser applications from accessing resources on the local machine. For example, web browsers will often prevent browser applications from accessing files on the local hard drive, operating system resources, etc. Web browsers may also prevent browser applications from communicating over a network, such as a local or wide area network connected to the local machine.

Unfortunately, because of a security mechanism of a web browser, it may be difficult for a mobile device to establish a low latency network connection with a game application executing within the web browser.

BRIEF SUMMARY OF THE INVENTION

In an embodiment, method of controlling a game may include executing a game application within a web browser on a host device. The method also includes establishing a communication channel over a computer network between the game application and a controller application running on an endpoint device, and sending data over the communication channel for controlling and playing the game application within the game application. The communication channel may include a first socket connection for loss-sensitive data and a second socket connection for loss-tolerant data.

In another embodiment, a system may include a host device executing a game application within a web browser. The system may also include an endpoint device executing an application for controlling content within the game application, and a communication channel established over a computer network between the host device and the endpoint device for carrying data configured to control the game application.

DETAILED DESCRIPTION OF THE EMBODIMENTS

The present invention may provide a system and method for connecting devices over a network. More particularly, the present invention may be used to connect and facilitate communication between a browser application running within a web browser and an application executing on an endpoint device.

Web browsers often employ security schemes, sometimes referred to as sandbox security, to ensure that browser applications cannot cause harm to a local machine. These security schemes may restrict a browser application from using local machine resources, such as the hard drive of the computer, I/O, or networking capabilities.

Typically, devices on a network can discover other devices on the network by broadcasting their presence on the network, and monitoring broadcasts from other devices. However, if a browser application, for example a FLASH application, is running within a web browser on a machine connected to a network, the security mechanisms of the web browser may prevent the browser application from discovering or communicating with other device connected to the network, even if those other devices are running applications that could otherwise communicate or interact with the browser application.

System Architecture

Figure 1:
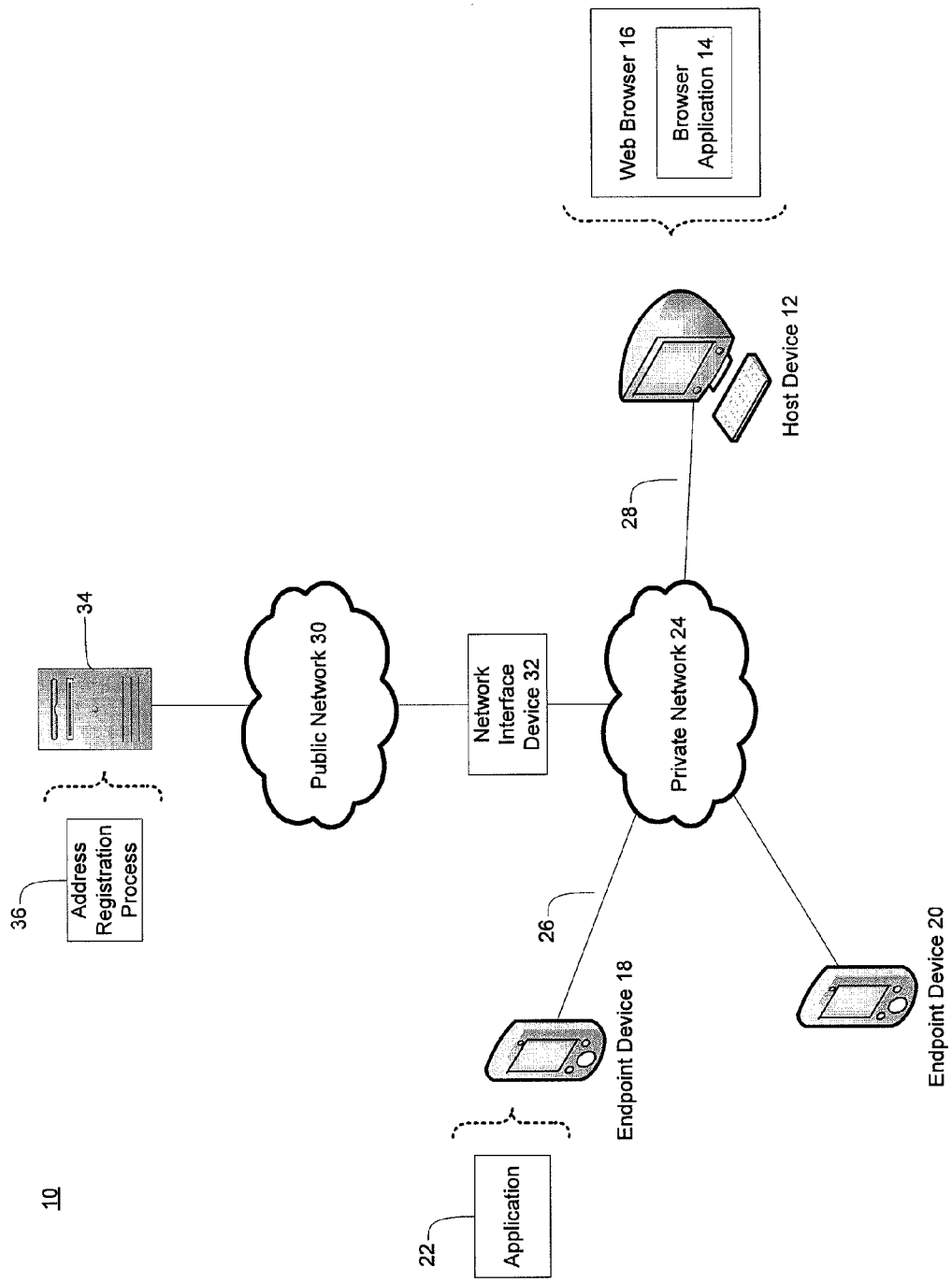
FIG. 1 is a block diagram of an exemplary computer network architecture suitable for operation of the present invention.

Referring now to FIG. 1, in an embodiment, the present invention provides a system and architecture 10 for controlling content within a web browser. The system may include host device 12, which may execute browser application 14 within web browser 16.

FIG. 1 shows host device 12 as a desktop computer, however host device 12 is not limited to desktop computers. For example, host device 12 may be a laptop computer, server computer, game console, mobile device, smart phone, internet television, home appliance, network- and processor-enabled remote control toy, internet enabled billboard, medical display device, iPad®, or any other device capable of running browser application 14 within web browser 16.

FIG. 1 also shows endpoint devices 18, 20. Endpoint device 18 may execute application 22, which may be an application configured to communicate with browser application 14. Endpoint device may typically be a network-enabled wireless handheld device, such as a PDA or smart phone, and application 22 is typically a mobile application. However, endpoint device may also be any type of device capable of running application 22 and connecting to private network 24, such as a laptop or desktop computer, a gaming console, a game controller, etc.

Endpoint device 20 may be another endpoint device within system 10. Endpoint device 20 is depicted here in FIG. 1 merely to show that other devices may be included within system 10 and connected to private network 24. Although not shown, endpoint device 20 may execute an application such as application 20, may execute other applications capable of communicating with browser application 14, or may execute applications capable of communicating with other browser applications, for example.

Host device 12 and endpoint devices 18, 20 may be connected to private network 18. Private network 18 can typically be a local are network (LAN), but may also be other types of networks, including but not limited to, a wired LAN, one or more LAN segments, a wireless LAN, a wide area network, a Bluetooth® network, a USB network, etc. Accordingly, connections 26, 28 may be wired or wireless connections and may employ any appropriate communication technologies and protocols to enable communication between the devices.

Private network 24 may also comprise multiple networks coupled together, multiple LAN segments, etc. For the sake of simplicity, this disclosure will describe private network 24 as a wired/wireless Ethernet LAN, typical of internet enabled households and businesses. Wired/wireless routers, such as those provided by Linksys® and other companies, can provide such a network. However, one skilled in the art will recognize that the inventions herein may operate within various different types of network topologies.

Private network 24 is shown as separated from public network 30 by network interface device 32. Public network 30 may be any type of LAN or WAN. In this example, public network 30 may represent a public network such as the internet.

Network interface device 32 may provide a bridge between private network 24 and public network 30, and also may provide a security barrier between private network 24 and the internet, such as a firewall. Typical examples of network interface device 32 are cable modems, DSL modems, T1 connections, and the like. Devices connected to public network 30 (i.e. the internet) typically cannot penetrate the security barrier of network interface device 32 to discover or communicate with devices on private network 32. However, in an embodiment, network interface device 32 may allow devices on private network 24 to access public network 30 so that they can browse the internet, download applications, and communicate with devices on the internet. Network interface device 32 may be a single network interface device, or may be multiple network interface devices that provide multiple access points between private network 24 and the internet.

Devices connected to private network 24 may receive a private network address, while devices connected to public network 30 may receive public network addresses. A private network address is an address specific to private network 24. Devices that receive a private network address from private network 24 can typically communicate freely with other devices on private network 24. However, devices on public network 30 typically cannot discover or communicate with devices on private network 24 having private network addresses because of the security mechanisms in network interface device 32. A typical example is a home or business LAN, where devices on the LAN can communicate with each other, and can access the internet, but devices on the internet cannot discover or initiate communications with the devices on the LAN.

Since network interface device 32 is connected to public network 30, network interface device may receive a public network address. A public network address is an address that can be accessed by devices on public network 30 and/or private network 24. Since, in this example, public network 30 represents the internet, the public network address received by network interface device is a public internet address, which can be accessed by other devices on the internet. The opposite may also be true.

In other words, devices on public network 30 (i.e. internet devices) can "see" network interface device 32 and its public network address, but they cannot "see" devices on private network 24. Devices on private network 24 can not only "see" the other devices on private network 24 and access them using their private network addresses, they can also "see" devices on public network 30 and access them using their public network addresses.

FIG. 1 also shows server 34, which is executing address registration process 36. Server 34 can be any type of computing device or group of devices capable of executing address registration process 36. Typically, server 34 is a server computer, an internet server, a group of servers, a cluster of servers, or any configuration of server computers.

System 10 shows a typical configuration for the inventions described herein. However, system 10 is not the only architecture within which the inventions described herein can operation. One skilled in the art will recognize that various system architectures can support the systems, methods, and apparatuses described herein. Also, although not shown, any of the applications and processes may be run by any computing device within system 10, or by any computing device capable or running the applications and processes. For example, host device 12 may execute address registration process 36 and/or application 22; endpoint devices 18, 20 may execute web browser 16, browser application 14, and or address registration process 36; and server 34 may execute web browser 16, browser application 14, and/or application 22.

As discussed, since browser application 14 is running within the security scheme of web browser 16, browser application 14 may not be able to discover or communicate with application 22, and application 22 may not be able to discover or communicate with browser application 14.

Computer Processing Device

Figure 2:
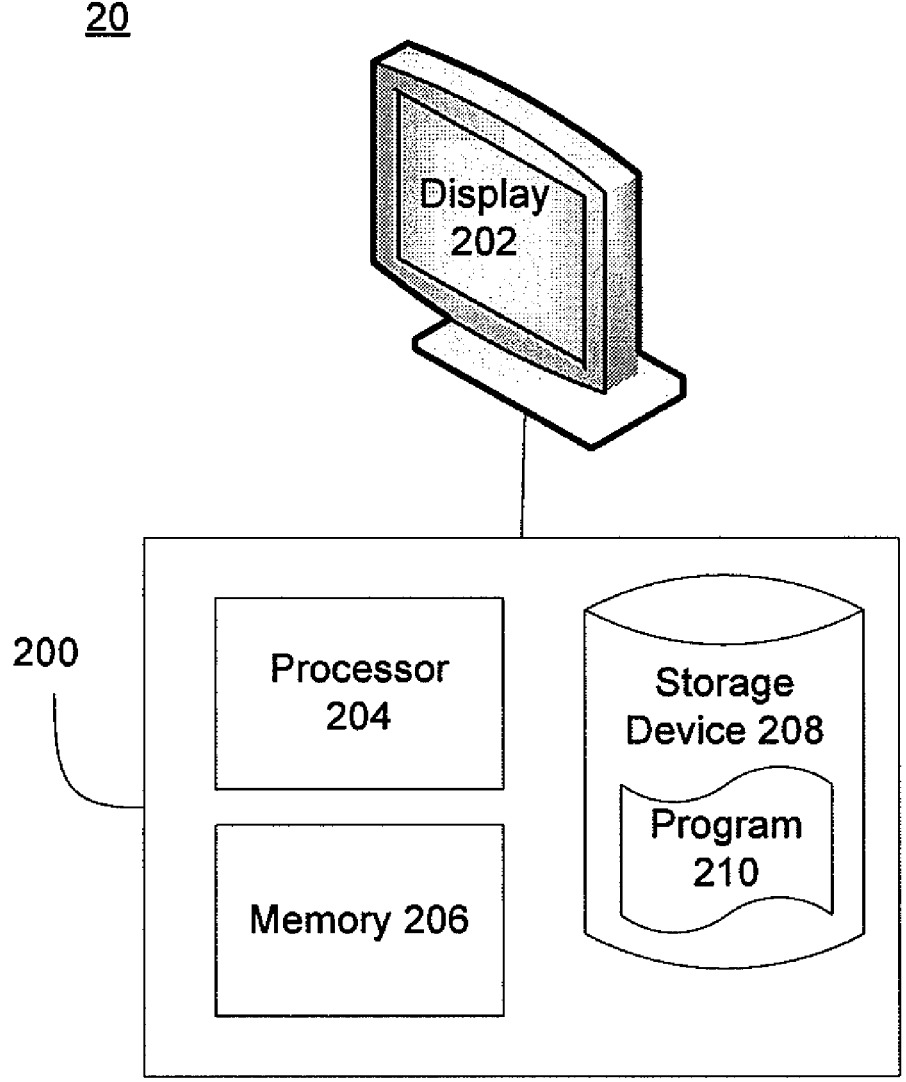
FIG. 2 is a block diagram of a computer processing device.

The present inventions may be implemented as hardware, software, or a combination of hardware and software. FIG. 2 shows a block diagram of a typical processing architecture, which may execute software applications and processes.

Computer processing device 200 is coupled to display 202 for graphical output. Processor 204 is a computer processor capable of executing software. Typical examples are computer processors (such as Intel® or AMD® processors), ASICs, microprocessors, and the like. Processor 204 is coupled to memory 206, which is typically a volatile RAM memory for storing instructions and data while processor 204 executes. Processor 204 is also coupled to storage device 208, which is a non-volatile storage medium, such as a hard drive, FLASH drive, tape drive, DVDROM, or similar device. Program 210 is a computer program containing instructions and/or data, and is stored on storage device 208. In a typical scenario, processor 204 may load some or all of the instructions and/or data of program 210 into memory 206 for execution. Program 210 can be any computer program or process including, but not limited to web browser 16, browser application 14, address registration process 36, application 22, or any other computer application or process.

Program 210 may include various instructions and subroutines, which, when loaded into memory 206 and executed by processor 204 cause processor 204 to perform various operations, some or all of which may effectuate the methods associated with the present inventions.

Although not shown, computer processing device 200 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 200.

Content Control Process

Figure 3:
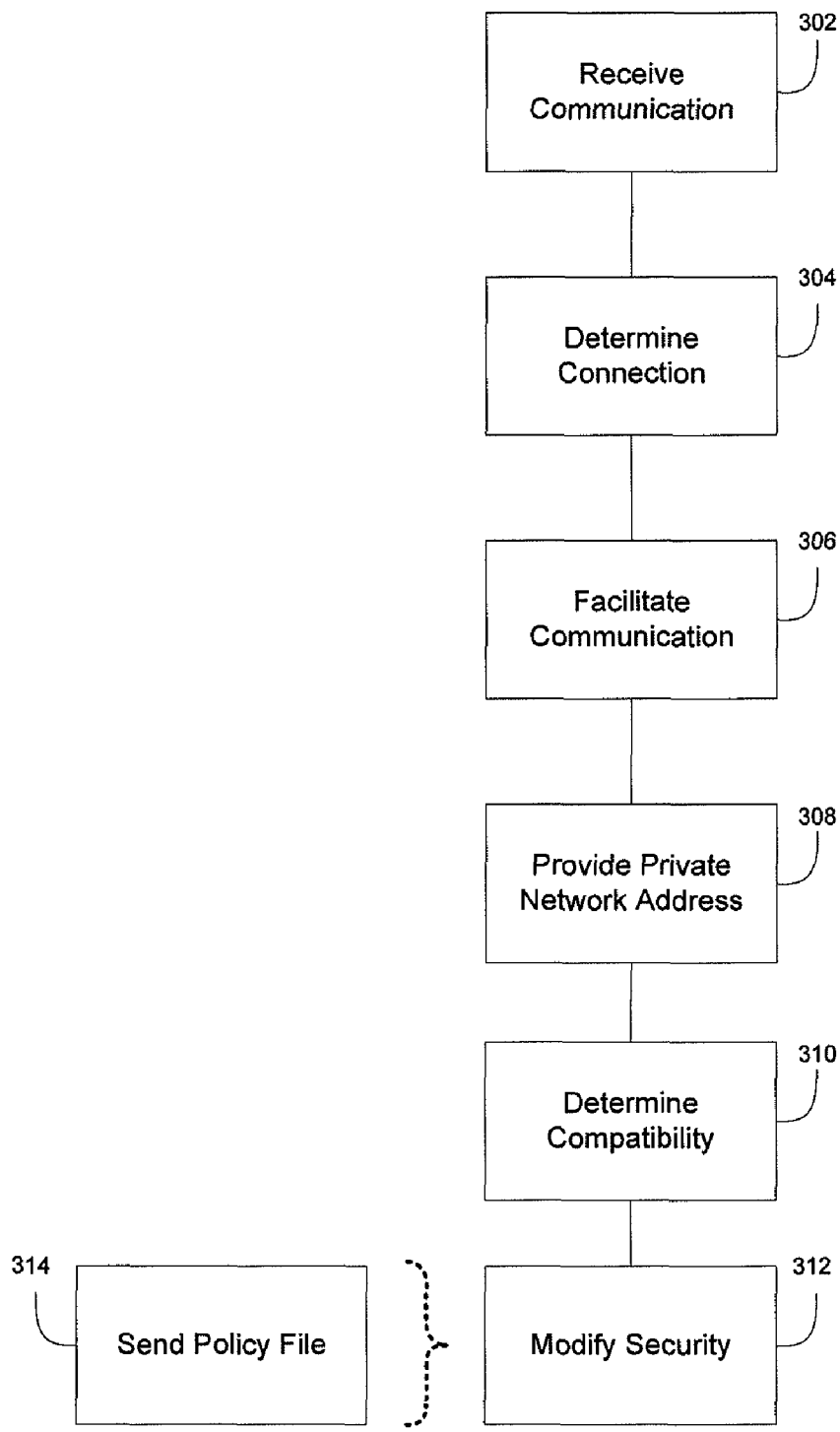
FIG. 3 is a flowchart depicting a method for use in connection with the present invention.

FIG. 3 shows a flowchart diagram that depicts a process for controlling content and/or establishing two-way communication within a web browser. The process may be implemented as software executing on one or more devices. For example, the process may run on host device 12, endpoint devices 18, 20, server 34, or any combination thereof. The process may also be implemented on any other capable device or in any appropriate architecture.

In an embodiment, the content control process may operate to control content within a web browser and/or engage in two-way communication with an application running within a web browser. In a specific embodiment, the process may facilitate connectivity and two-way communication between browser application 14 and application 22, and allow application 22 to control web browser content displayed by browser application 14. In one example, browser application 14 is a video game downloaded by a user. The video game runs as a browser application (e.g. a FLASH application) within web browser 16, and is subject to the security restrictions of web browser. In the same example, application 22 running on endpoint device 18 is a game controller application downloaded by the user. The controller application acts as a game controller and allows the user to control and/or play the FLASH game. The user may wish to connect the game controller application to the video game so he or she can play. However, since the video game is executing within the security schema of web browser 16, the controller application and the video game may not be able to discover and communicate with each other.

In order for the applications to communicate, server 34 (and/or address registration process 36) may receive 302 a communication from application 22, which is running on endpoint device 18. In one embodiment, application 22 may send the communication in order to register its addresses with server 34. Accordingly, the communication may include private network address of endpoint device 18 (i.e. the private network address within private network 24), and may also include the public address of endpoint device 18. In this example, since network interface device 32 is the bridge between private network 24 and public network 30, public network address of endpoint device 18 may match, at least in part, the public network address of network interface device 32.

In some cases, the communication may also contain an application ID. Application 22 may have an application ID that it sends to server 34 along with the public and private network addresses.

Browser application 14 (running within browser 16 on host device 12) may also send a communication to server 34. Similarly, the communication from browser application 14 may serve to register browser application 14 with address registration process 36. The communication may contain the public network address of host device 12, and may also contain an application ID that uniquely identifies browser application 14. In this case, as discussed above, the public network address of host device 12 may match, in whole or in part, the public network address of network interface device 32, since network interface 32 provides the interface between host device 12 and public network 30. In some embodiments, the communication from browser application 14 and/or from application 22 also contains other information, such as the private network address of host device 12, other information about host device 12, application data, user data, or any other type of information.

Figure 4:
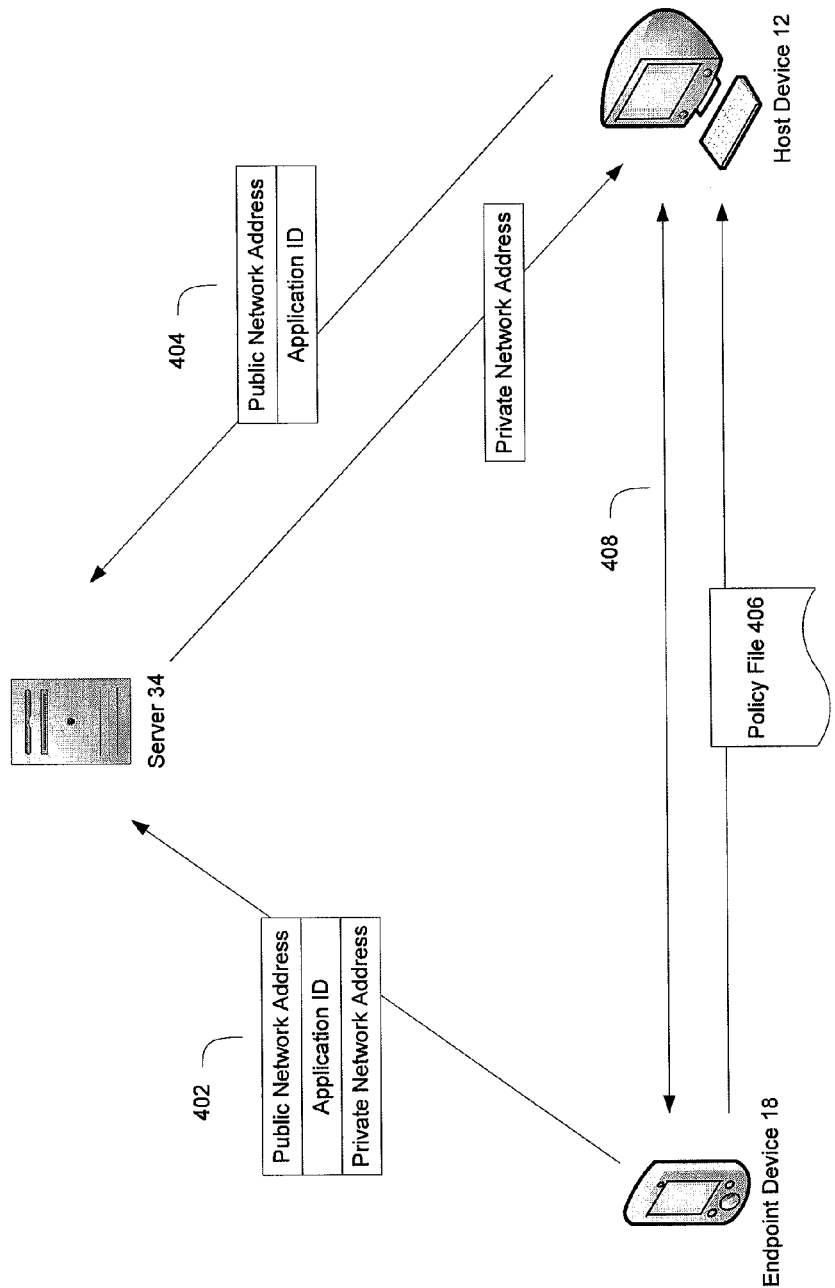
FIG. 4 is a block diagram illustrating some of the operations of the present invention.

FIG. 4 shows a an example of the communications between endpoint device 18, host device 12, and server 34. As shown, communication 402 includes the public and private network addresses of endpoint device 18, and an application ID of application 22. Similarly, communication 404 contains the public network address of host device 12 and the application ID of browser application 14\. The opposite may also be true.

Server 34 may receive communications from other endpoint devices and host devices (not shown). In one embodiment, server 34 is an internet server that receives communications (include network addresses and application IDs) from devices connected to various private networks throughout cyberspace. Server 34 may record and catalog the information it receives from these various devices in, for example, a database or other data store.

Upon receipt of the communications, server 34 may determine 304 whether endpoint device 18 and host device 12 are connected to the same local network based upon the public network addresses within the communications. As described above, the public network address is typically associated with a public-facing device connected to the local network. In FIG. 1, that device is network interface device 32. Therefore, in this example, when server 34 receives communication 402 from endpoint device 18, the public network address may indicate that endpoint device 18 is connected to private network 24 since the communication is being routed through network interface device 32. Similarly, the public network address in communication 404 from host device 12 may indicate that host device 12 is connected to private network 24 and that communication 404 is being routed through network interface device 32.

By comparing the public network address of various devices in this way, server 34 can determine which devices are connected to the same private networks. The public network addresses may match, in whole or in part, or may otherwise be related. For example, server 34 may determine that two devices are connected to the same private network if the public network addresses of the two devices match. In another example, server 34 may determine that two devices are connected to the same private network if the public network addresses of the two devices have the same subnet address. Server 34 may also contain a lookup table or other device that provides information about which public network addresses are associated with various private networks. By utilizing the lookup table or other mechanism, server 34 may determine whether received public network addresses indicate that devices are connected to the same private network.

System 10 may also facilitate a network connection between browser application 14 and application 22 by providing 308 the private network address of endpoint device 18 to browser application 14. As discussed above, browser application 14 and application 22 may not be able to connect or communicate with each other if the security mechanisms of web browser 16 prevent such communication. For example, the security mechanisms of web browser 16 may prevent browser application 14 and from broadcasting its presence on private network 24. Similarly, the security mechanisms of web browser 16 may prevent browser application 14 from receiving broadcasts from application 22.

However, browser application 14 may be able to communicate directly with application 22 if browser application 14 knows the private network address of endpoint device 18. By providing the private network address of endpoint device 18 to browser application 14, the system may be able to modify the security policy of web browser 16 to allow communication between browser application 14 and application 22.

In some embodiments, address registration process 36 and/or server 34 will provide the private network address of endpoint device 18 to browser application 14 only if application 22 and browser application 14 are compatible applications. For example, if address registration process 36 determines 310 that browser application 14 is a game application and application 22 is a controller application for that game, then address registration process 36 may determine that application 22 and browser application 14 are compatible applications and send the private network address of endpoint device 18 to browser application 14, so that browser application 14 and application 22 can communicate with each other. However, if browser application 14 and application 22 are not compatible, then address registration process may not send the private network address to browser application 14. For example, if browser application 14 is a video game, but application 22 is an application for drawing pictures, then they are likely not compatible. In this case, there may be no need to send the private network address of endpoint device 18 to browser application 14 in order to initiate communication between browser application 14 and application 22.

Address registration process 36 may determine 310 whether applications are compatible in various ways. In one embodiment, address registration process 36 may compare the application IDs received from application 22 and browser application 14. If the application IDs indicate the applications are compatible, address registration process may provide 308 the private network address of endpoint device 18 to browser application 14. The application IDs may indicate the applications are compatible if the application IDs match, for example. In other embodiments, the application IDs may indicate compatibility if they are associated in some other way. For example, address registration process 36 may have a lookup table or hash table of application IDs that links compatible application IDs.

The application IDs may be any unique identifier and may include information such as a code representing the application and/or its version number, the name of the application, etc. The opposite may also be true.

In some embodiments, address registration process 36 may provide 308 the private network address to browser application 14 in various ways. In one embodiment, browser application 14 may periodically poll address registration process 36 and ask for the address. Upon receipt of the request, address registration process 36 may send browser application 14 a list of the private network addresses of all endpoint devices that are running compatible applications and connected to private network 24. In another embodiment, address registration process 36 may send the private network address of an endpoint device to browser application 14 whenever an endpoint device running a compatible application and connected to private network 24 registers with address registration process 36. In yet another embodiment, address registration process 36 may periodically broadcast lists of private network addresses, which can be retrieved by browser application 14 whenever appropriate. Other schemes of providing 308 the private network addresses to browser application 14 may also be employed.

If the security of web browser 16 prevents communication between browser application 14 and application 22, then the system may modify 312 the security policy of web browser 16 to allow for the communication. For example, endpoint device 18 may send 314 a policy file to host device 12.

Referring to FIGS. 3 and 4, in one embodiment, endpoint device 18 may send 314 policy file 406 to host device 12 by serving the policy file through a web server. Endpoint device 18 may execute a web server application, which may be incorporated into application 22, or may be a standalone or off-the-shelf web server application. Typical off-the-shelf web server applications include the Apache® web server, Microsoft IIS® web server, etc. One skilled in the art will recognize that other devices, such as endpoint device 20 or server 34, may also execute the web server application and send 314 the policy file 406 to host device 12.

Upon receipt of the private network address of endpoint device 18, browser application 14 may access the web server executing on endpoint device 18 and download policy file 406. Policy files are typically known in the art. In this example, policy file 406 may contain a new security policy for web browser 16 or changes to the security policy of web browser 16 that allow for communication between browser application 12 and application 22. When browser application 14 receives policy file 406, it may apply the policy file to the security policy of web browser 16 to allow for such communication, for example, as shown by arrow 408.

In another embodiment, the security policy of web browser 16 may be modified 312 through an HTML5 handshake. HTML5 handshakes are also typically known in the art. In this case, application 22 and browser application 14 may perform the HTML5 handshake in order to modify the security profile of web browser 16 and allow communication between browser application 14 and application 22.

Network Communication

In some embodiments, the methods and systems may facilitate communication between browser application 14 and application 22. As discussed, web browser 16 may include security mechanisms that prevent browser application 14 from discovering or communicating with endpoint devices 18, 20 over private network 24. To facilitate communications, application 22 may send the private network address of endpoint device 18 to one or more network-enabled devices.

In the example above, application 22 may send the public and/or private network address of endpoint device 18, and/or an application ID to server 34. However, one skilled in the art will recognize that application 22 may send such information to any device, or may broadcast such information to any device, in order to facilitate communications between application 22 and browser application 14. Similarly, browser application 14 may send the public network address of host device 12, the private network address of host device 12, and/or an application ID to server 34 in order to facilitate communication with application 22. However, on skilled in the art will recognize that browser application 14 may send such information to any device, or may broadcast such information to any device, in order to facilitation communications between application 22 and browser application 14.

In an embodiment, application 22 and/or browser application 14 may establish socket connections in order to facilitate communications. As used herein, the term socket refers to any unidirectional or bidirectional inter- or intra-process data or communication flow over a network. The socket connections may be initiated by application 22, browser application 14, or both. The socket connections may be any continuous or intermittent communication connections between application 22 and browser application 14 through private network 24.

In various embodiments, browser application 14 and application 22 establish one or more socket connections, and are the endpoints of the socket connections. However, various other devices (such as endpoint device 20 and/or an application running on endpoint device 20) may establish the socket connections and may also be endpoints in the socket connections. In some embodiments where multiple devices are involved in communication, more than two devices can communicate over the socket connections.

Browser application 14 and/or application 22 may first initiate the socket connections, which may each provide communication flow from browser application 14 to application 22, from application 22 to browser application 14, or both.

Figure 5:
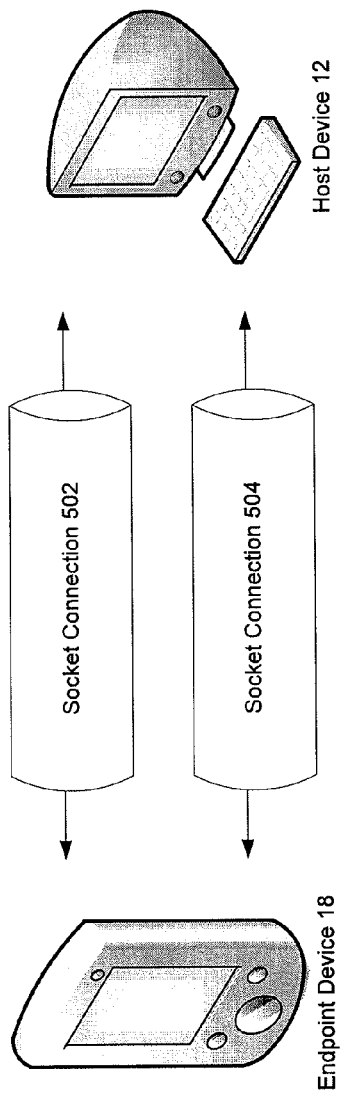
FIG. 5 is a block diagram illustrating network connections.

Referring to FIG. 5, upon receipt of the private network address of endpoint device 18 and upon initiation of communications, browser application 14 and/or application 22 may establish a socket connection 502 and second socket connection 504 between browser application 14 and application 22. Although FIG. 5 shows only two socket connections, one skilled in the art will recognize that the applications may also establish additional socket connections to facilitate communications.

In one embodiment, socket connection 502 may be a TCP connection. As known in the art, TCP is a reliable communication protocol. The TCP protocol provides features that limit packet and data loss between endpoints, as well as features that ensure packets are received and/or processed in a correct order. Accordingly, browser application 14 and application 22 may send loss-sensitive data over socket connection 502. As an example, if browser application 14 is a game and application 22 is a game controller application, loss-sensitive data may include control data such as button presses, command acknowledgements, control data, setup and initiation data, etc. In general, the data sent over socket connection 502 may be any data that the application deems to be loss-sensitive. In other words, any data where the absence of receipt of the data on the receiving end of the socket could cause problems, inconsistencies, or bugs in the application may be deemed loss-sensitive data and sent over socket connection 502.

Socket connection 504 may be a UDP connection, for example. As known in the art, UDP is an unreliable communication protocol and does not include mechanisms to ensure receipt of data. Accordingly, browser application 14 and application 22 may send loss-tolerant data over socket 504. Loss tolerant data may include any type of data where the loss of at least some of the data will not cause problems, inconsistencies, or bugs in the application. Typical examples of loss tolerant data include streaming video, streaming audio, etc. These types of data are considered loss tolerant because, if some of the data are not received, the audio or video stream may not be significantly interrupted. In some embodiments, other types of data, such as accelerometer measurements from a smart phone, vibration commands for enabling a vibration device in a phone, etc., are considered loss-tolerant data and are sent over socket 504. The opposite may also be true.

Figure 6:
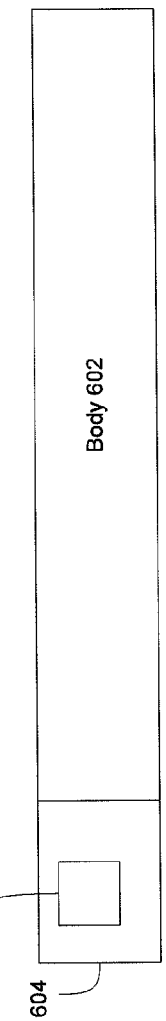
FIG. 6 is a block diagram illustrating a packet.

Application 14 and/or browser application 22 may generate network packets for transmission over sockets 502, 504 by using pre-constructed packet headers and/or pre-constructed packet templates. Referring to FIG. 6, packet 600 may be a network packet for transmission over socket 502 or socket 504. Packet 600 may include a body 602, which may contain a data payload, and a header 604, which may contain routing and other information concerning the transmission of packet 600 over the network. In some embodiments, header 604 may include indicator 606, which may identify whether packet 600 contains loss-sensitive traffic and should be routed over socket 502, or contains loss-tolerant traffic and should be routed over socket 504. Indicator 606 may be any data type known in the art capable of indicating how packet 600 should be routed.

Packet 600 may be constructed through the use of pre-constructed packet headers and/or pre-constructed packet templates. For example, if the data payload of packet 600 contains loss-sensitive data, packet 600 may be generated using a pre-constructed packet template designed to ensure packet 600 is routed over socket 502 (the TCP socket) once it enters a network stack for transmission and routing. Similarly, if the data payload of packet 600 contains loss-tolerant data, packet 600 may be generated using a pre-constructed header or template designed to ensure packet 600 is routed over socket 504 (the UDP socket) once it enters a network stack for transmission and routing. Of course, the opposite may also be true.

In some embodiments, the header or template used to generate packet 600 may determine the value of indicator 606, and whether indicator 606 will indicate whether packet 600 should be routed over socket 502 or socket 504. Accordingly, once packet 600 enters a network stack for transmission and routing, application 22 and/or browser application 14 may read indicator 606 and/or a data type encoded within header 604 or indicator 606, and may route packet 600 over socket 502 or socket 504 as appropriate.

During development, an application developer may decide what types of application data are loss-tolerant and what types are loss-sensitive. In this case, the developer may determine which pre-constructed header to use for different types of data. Additionally/alternatively, browser application 14 and application 22, or a development environment used to create browser application 14 and/or application 22, may provide defaults for particular data types. For example, browser application 14 and application 22 may, by default, use a pre-constructed header for loss-tolerant data whenever they send streaming audio or streaming video data over the network to each other. One skilled in the art will recognize that various defaults may be employed so that particular types of data are routed over the appropriate type of socket connection.

Routing loss-tolerant data over socket connection 504 and loss-sensitive data over socket connection 502 may result in reduced latency and more efficient network communication between application 22 and browser application 14. For example, by sending loss-tolerant data (such as streaming video) over socket 504 (the UDP connection), the protocol stacks of application 22 and browser application 14 may become less clocked. Also, reserving socket 502 (the TCP connection) for loss-sensitive, but less voluminous data, such as command and control data, may also reduce the possibility of a network stack bottleneck.

Although the descriptions above provide examples with a single endpoint device, a single host device, and a single server, one skilled in the art will recognize that any combination employing single or multiple devices are possible. Any combination of single or multiple endpoint devices, single or multiple host devices, and/or single or multiple address registration server devices may fall within the scope of the invention. For example, multiple endpoint devices may connect to a single host device, a single endpoint device may connect to a single host device, single or multiple host and/or endpoint devices may communicate with single or multiple address registration server devices, etc. Other combinations are also within the scope of the invention.

Furthermore, browser application 14 and application 22 may be compatible applications designed to communicate with each other. For example, browser application 14 may be a game and application 22 may be a game controller application designed to be compatible with one another. Similarly, browser application 14 and application 22 may be the same application, e.g., they may be the same game running on different platforms and communicating, for example, in a head-to-head match.

Additionally/alternatively, browser application 14 and application 22 may be different applications that can communicate with each other over the network.

Gaming Example

The following example shows one embodiment of the present invention, which may effectuate game and/or video game play within system 10.

Figure 7:
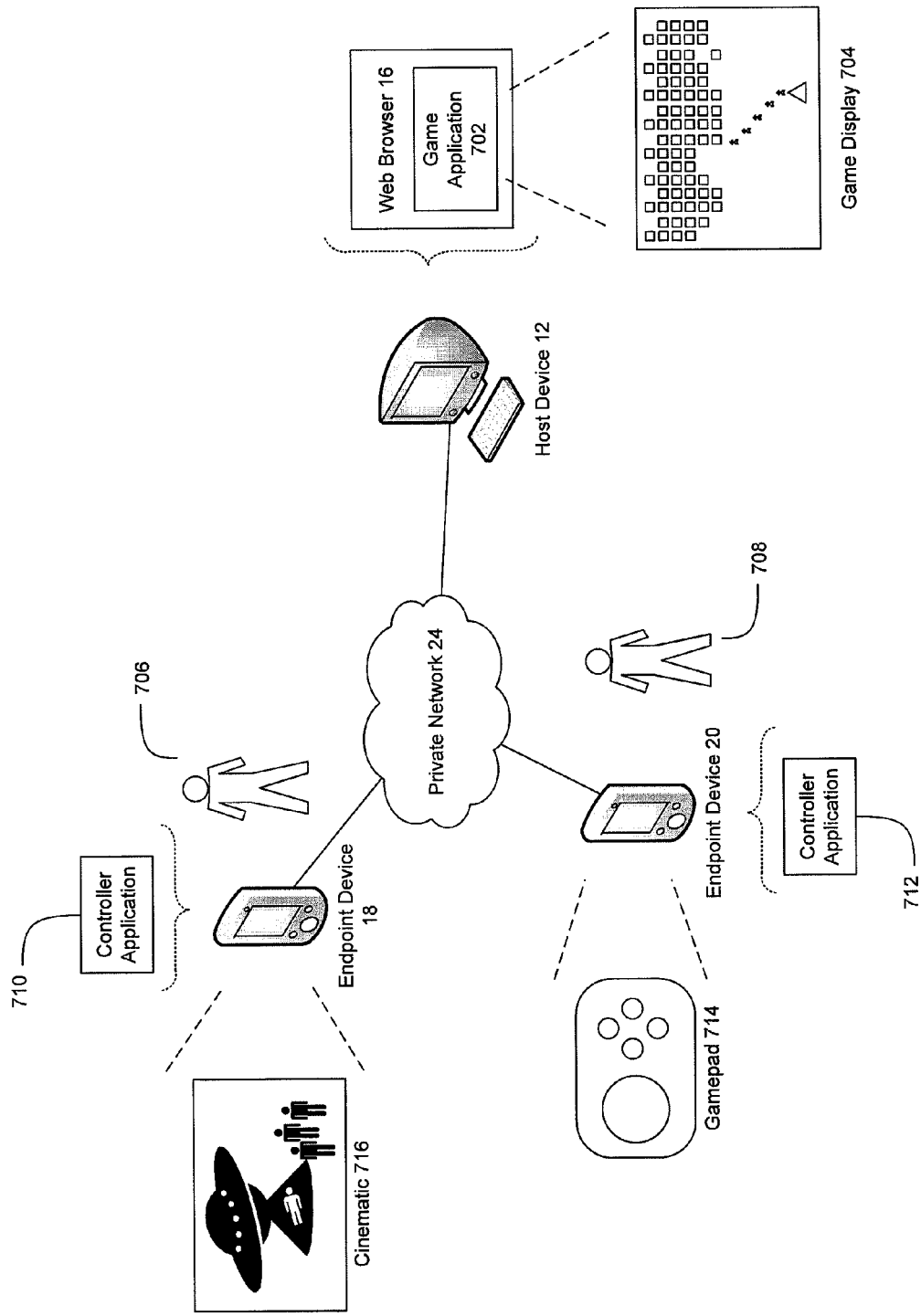
FIG. 7 is a block diagram illustrating an embodiment of the invention for controlling game content.

FIG. 7 shows an alternate view of system 10. In FIG. 7, host device 12 is connected to private network 24, and is executing game application 702 within web browser 16.

Game application 702 may be a game, such as a video game, lottery game, word game, or any sort of application designed for entertainment running within browser 16. As noted above, game application 702 may be a FLASH, Unity, web script, HTML5, or other browser application capable of executing within web browser 16. Web browser 16 may be a web browser application for downloading, uploading, and/or displaying internet web content to a user.

Display 704 shows a screen image of game application 702. The screen image may be static or dynamic, and may display some or all aspects of the game in order to provide users 706, 708 visual feedback as they play the game. Although FIG. 7 shows display 704 as being displayed within web browser 16 on host device 12, one skilled in the art will recognize that display 704 may also be displayed on other devices within system 10. For example, game application 702 could send data over private network 24 in order to present display 704 on another device. In other words, display 704 may be shown on host device 12, endpoint devices 18, 20, and/or another device (not shown) capable of presenting display 704 to a user.

Endpoint devices 18, 20 may be connected to private network 24 and may execute controller applications 710, 712 (respectively). Controller applications 710, 712 may be applications configured to connect to, communicate with, and/or control game play of game application 702. Controller applications 710, 712 may be the same application, or may be different applications that are each compatible with game application 702.

Users 706, 708 may use endpoint devices 18, 20 and controller applications 710, 712 to play game application 702. In order to enable game play, controller applications 710, 712 may establish connection(s) with game application 702 over private network 24.

As discussed above, web browser 16 include security mechanisms to prevent game application 702 from discovering, connecting, and/or communicating with controller applications 710, 712. Accordingly, controller applications 710, 712 may send a communication to a server (such as server 36 in FIG. 1) that includes public and/or private addresses of endpoint devices 18, 20. The communication may also contain an application ID for identifying controller application 710 and/or 712. Game application 702 may also send a communication to server 36 containing a private network address of host device 12 and/or an application ID of game application 702.

Once the communications are received by server 36, server 36 may determine whether controller application 710 and/or controller application 712 are compatible with game application 702. If controller application 710 (associated with endpoint device 18) is compatible, server 36 may provide 308 the private network address of endpoint device 18 to game application 702. Likewise, if controller application 712 (associated with endpoint device 20) is compatible, server 36 may provide 308 the private network address of endpoint device 20 to game application 702, in order to facilitate communication between the devices.

Game application 702 and endpoint devices 18, 20 may then establish connections over private network 24 with game application 702. As discussed above, game application 702 and controller applications 710, 712 may establish a first socket connection for loss-sensitive data, and a second socket connection for loss-tolerant data.

As shown in FIG. 7, controller application 712 and/or endpoint device 20 include a gamepad 714. Gamepad 714 may include buttons, dials, and other sensors built into endpoint device 20, and may also include buttons, dials, and other sensors displayed as graphics within a touchpad display of endpoint device 20. By using the gamepad 714, user 708 may play game application 702. When user 708 pushes a button, presses a D-Pad, or otherwise uses gamepad 714 to provide input to controller application 714, controller application 714 may send data representing that input to game application 702. The data may be used to control the game by, for example, moving a character or firing a weapon within the game. If endpoint device 20 has an accelerometer or gyroscope, controller application 712 may send tilt, motion, and/or position data to game application 702 for controlling and/or playing game application 702. If the data sent by controller application 712 is deemed to be loss-sensitive, controller application 712 may send the data over the socket connection associated with loss-sensitive data. Likewise, if the data sent by controller application 712 is deemed to be loss-tolerant, controller application 712 may send the data over the socket connection associated with loss-tolerant data.

Controller application 712 may also receive data from game application 702. The data received may be any data associated with game application 702.

Controller application 710 and/or endpoint device 18 is shown displaying cinematic 716. Cinematic 716 may be a static picture, a dynamic video, etc. Cinematic 716 may or may not include audio. Cinematic 716 may be displayed on a display screen or played through speakers associated with endpoint device 18 and/or controller application 710.

Cinematic 716 may, in some embodiments, be an audio and/or video stream sent by game application 702. In this case, controller application 710 may receive the audio and/or video data for playback on endpoint 18 or another device. If the audio and/or video are deemed to be loss-tolerant data, then game application 702 may send the audio and/or vide data over the socket connection established for carrying loss-tolerant data.

FIG. 7 shows one embodiment of the present invention. However, one skilled in the art will recognize that FIG. 7 is not limiting, and that other arrangements are within the scope of the claims. For example, display 704 may be shown on host device 12, endpoint devices 18, 20, another device, or not shown at all. Likewise, the audio/video data for cinematic 716 may originate from any device and be displayed on any device. Similarly, gamepad 714 and/or cinematic 716 may be displayed on any device. The data sent between the devices may originate on any device and be received and/or processed by any device or software program within the system.

Operation of the Embodiments

The following example illustrates the operation of some embodiments of the present invention. Browser application 14 may be a game application 702 executing within web browser 16, which may be executing on host device 12. Browser application 14 sends a communication with the public network address of host device 12 to server 34.

Application 22 may be a controller application 710, 712 for communicating with and controlling game content displayed by game application 702, and may be executing on endpoint device 18. Controller application 710 (and/or 712) may send a communication to server 34 with the public and private network addresses of endpoint device 18.

Server 34 may determine that controller application 710 (and/or 712) and game application 702 are compatible applications executing on devices connected to the same local network. If so, server 34 may send the private network address of endpoint 18 to game application 702 to facilitate connectivity between the two.

Game application 702 and controller application 710 (and/or 712) may then communicate with each other over private network 24, and may modify the security policy of web browser 16 to allow for two way communication between game application 702 and controller application 710 (and/or 712).

Game application 702 and controller application 710 (and/or 712) may then establish a loss-sensitive socket connection (e.g. a TCP connection) and a loss-tolerant socket connection (e.g. a UDP connection), and reduce network latency by sending loss-sensitive data over the loss-sensitive socket connection, and loss-tolerant data over the loss-tolerant socket connection.

The present disclosure makes reference to various block diagrams and flowcharts. One skilled in the art will recognize that the order and configuration of components in the block diagrams and steps in the flowcharts are not limitations and are provided for illustration only. Various appropriate configurations of components and devices, and various orders and sequences of operation may fall within the scope of the claims.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A method of controlling a game, the method comprising:
executing, by a host device in communication with a computer network, a game application within a web browser having a security policy that restricts browser applications from communicating over the computer network;
determining, by a server device, whether the game application and a controller application executing on a wireless endpoint device are compatible with each other, the controller application being able to display game controller functions on the endpoint device;
if compatibility is determined, sending, from the server device to the game application, a private network address of the endpoint device so that the game application and the controller application can subsequently create an exception in the security policy of the web browser to allow subsequent establishment of a direct communication channel between the game application and the controller application for playing the game; and
sending loss-tolerant and loss-sensitive data, by the controller application, the game application, or both, to one another over the communication channel for controlling and playing the game application, through the controller functions, within the web browser.

2. A method as set forth in claim 1 wherein the step of establishing the communication channel includes opening at least one socket connection between the host device and the endpoint device.

3. A method as set forth in claim 2 wherein the step of opening includes creating a first socket connection for carrying the loss-sensitive data.

4. A method as set forth in claim 3 wherein the step of creating includes actualizing the first socket connection as a TCP connection.

5. A method as set forth in claim 3 wherein the step of creating includes delivering, over the first socket connection, one or more of:
game control data;
button press data;
game initialization data; and
game controller initialization data.

6. A method as set forth in claim 2 wherein the step of establishing includes creating a second socket connection for carrying the loss-tolerant data.

7. A method as set forth in claim 6 wherein the step of creating includes actualizing the second socket connection as a UDP connection.

8. A method as set forth in claim 6 wherein the step of creating includes delivering, over the second socket connection, one or more of:
accelerometer data;
video data;
audio data; and
vibration command data.

9. The method as set forth in claim 1, wherein the controller application is a downloadable, mobile application.

10. The method as set forth in claim 1, wherein the step of sending includes transmitting and receiving the data over the communication channel, independent of the server device.

11. The method as set forth in claim 1, further comprising determining, by the server device, whether the endpoint device and the host device are connected to a same local area network; and
if it is so determined, sending, by the server device, a communication to the endpoint device, the host device, or both that allows the game application and the controller application to establish the direct communication channel.

12. A system for controlling a game within a web browser, the system comprising:
   a host device including an instruction set for executing a game application within a web browser having a security policy that restricts communication by the game application across a computer network;
   a wireless endpoint device including an instruction set for executing a controller application which can display control functions on the endpoint device, and for sending, to the host device over the computer network, data configured to create an exception in the security policy to allow for subsequent communication of game-related data, across the computer network, between the game application and the controller application for playing the game;
   a server device including an instruction set to determine whether the game application and the controller application are compatible with each other and, if compatibility is determined, to send a private network address of the endpoint device to the game application so that the game application and the controller application can subsequently establish the security exception; and
   a direct communication channel established to carry loss-tolerant and loss-sensitive data for controlling and playing the game application, through the controller functions, between the game application and the controller application.

13. A system as set forth in claim 12 wherein the communication channel includes at least one socket connection.

14. A system as set forth in claim 13 wherein a first socket connection is configured to carry the loss-sensitive data.

15. A system as set forth in claim 14 wherein the first socket connection is a TCP connection.

16. A system as set forth in claim 14 wherein the loss-sensitive data includes one or more of:
   game control data;
   button press data;
   game initialization data; and
   game controller initialization data.

17. A system as set forth in claim 13 wherein a second socket connection is configured to carry the loss-tolerant data.

18. A system as set forth in claim 17 wherein the second socket connection is a UDP connection.

19. A system as set forth in claim 17 wherein the loss-tolerant data includes one or more of:
   accelerometer data;
   video data;
   audio data; and
   vibration command data.

20. A method of controlling a game within a web browser, the method comprising:
   within a web browser having a security policy that restricts browser application from communicating over a computer network, executing, by a host device in communication with the computer network, a game application;
   running, by a wireless endpoint device, a controller application configured to communicate with the game application and display controller functions, on the endpoint device, for controlling and playing the game application;
   determining, by a server device, whether the game application and the controller application are compatible with each other;
   if compatibility is determined, sending, from the server device to the game application, over the computer network, a private network address of the endpoint device so that the game application and the controller application can subsequently create an exception in the security policy of the web browser and allow the game application, the controller application, or both to establish a TCP socket connection and a UDP socket connection between the game application and the controller application for playing the game; and
   sending, by the game application, the controller application, or both, loss-sensitive game data over the TCP socket and loss-tolerant game data over the UDP socket for playing the game.

* * * * *